(12) United States Patent
Shapiro et al.

(10) Patent No.: US 11,169,253 B2
(45) Date of Patent: Nov. 9, 2021

(54) DISCRIMINATE AMONG AND ESTIMATE VELOCITIES OF MULTIPLE OBJECTS USING MULTI-NODE RADAR SYSTEM

(71) Applicant: GM Global Technology Operations LLC, Detroit, MI (US)

(72) Inventors: David Shapiro, Netanya (IL); Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 16/380,007

(22) Filed: Apr. 10, 2019

(65) Prior Publication Data
US 2020/0326417 A1    Oct. 15, 2020

(51) Int. Cl.
| | |
|---|---|
| *G01S 13/58* | (2006.01) |
| *G01S 7/41* | (2006.01) |
| *G01S 13/931* | (2020.01) |
| *G01S 13/42* | (2006.01) |
| *G01S 13/00* | (2006.01) |

(52) U.S. Cl.
CPC ............ *G01S 13/589* (2013.01); *G01S 7/417* (2013.01); *G01S 13/003* (2013.01); *G01S 13/931* (2013.01)

(58) Field of Classification Search
CPC ....................................................... G01S 7/354
See application file for complete search history.

(56) References Cited

U.S. PATENT DOCUMENTS

| | | | | |
|---|---|---|---|---|
| 8,704,704 | B2* | 4/2014 | Luebbert | G01S 13/931 342/132 |
| 9,759,811 | B2* | 9/2017 | Liu | G01S 13/003 |
| 2004/0135718 | A1* | 7/2004 | Herberthson | G01S 13/003 342/59 |
| 2005/0219115 | A1* | 10/2005 | Herberthson | G01S 13/003 342/90 |
| 2008/0186223 | A1* | 8/2008 | Mayer | G01S 13/931 342/109 |
| 2011/0309968 | A1* | 12/2011 | Reiher | G01S 7/354 342/70 |
| 2017/0031013 | A1* | 2/2017 | Halbert | G01S 13/003 |

FOREIGN PATENT DOCUMENTS

EP    3176603 A1 *  6/2017  ............. G01S 13/42

* cited by examiner

*Primary Examiner* — Bernarr E Gregory
(74) *Attorney, Agent, or Firm* — Cantor Colburn LLP

(57) ABSTRACT

A system and method using a multi-node radar system involve receiving reflected signals at each node of the multi-node radar system, the reflected signals resulting from reflection of transmitted signals by one or more objects, and generating velocity lines associated with each of the reflected signals received at each of the nodes, each velocity line being derived from a radial velocity Vr and an angle of arrival θ determined from the reflected signal received at the node. The method also includes determining one or more intersection points of the velocity lines, and estimating a velocity of each of the one or more objects based on the one or more intersection points. Each intersection point corresponds with the velocity for one of the one or more objects and the velocity is a relative velocity vector between the one of the one or more objects and the radar system.

20 Claims, 6 Drawing Sheets

DISCRIMINATE AMONG AND ESTIMATE VELOCITIES OF MULTIPLE OBJECTS USING MULTI-NODE RADAR SYSTEM

INTRODUCTION

The subject disclosure relates to discriminating among multiple objects and estimating their velocities using a multi-node radar system.

Radar systems and other sensors are increasingly used in vehicles (e.g., automobiles, trucks, farm equipment, construction equipment, automated factories) to obtain information about the vehicle and its surroundings. A radar system may identify objects in the path of the vehicle, for example, and facilitate autonomous or semi-autonomous vehicle operation. The radar system having a wide field of view (i.e., wide aperture) facilitates obtaining more information about the surroundings of the vehicle. Thus, an array of multiple nodes may be used. Each node may include one or more transmit and receive antenna elements or transceivers. However, when there are multiple objects at similar ranges to the radar system, correctly determining the velocity of each of the objects is challenging. This is because the angle of arrival of reflections from each of the objects to each of the nodes is different. As such, associating the reflections at each of the nodes from the same object is difficult. Accordingly, it is desirable to provide discrimination among multiple objects and estimate their velocities using a multi-node radar system.

SUMMARY

In one exemplary embodiment, a method of using a multi-node radar system includes receiving reflected signals at each node of the multi-node radar system, the reflected signals resulting from reflection of transmitted signals by one or more objects, and generating velocity lines associated with each of the reflected signals received at each of the nodes, each velocity line being derived from a radial velocity Vr and an angle of arrival θ determined from the reflected signal received at the node. The method also includes determining one or more intersection points of the velocity lines, and estimating a velocity of each of the one or more objects based on the one or more intersection points. Each intersection point corresponds with the velocity for one of the one or more objects and the velocity is a relative velocity vector between the one of the one or more objects and the radar system.

In addition to one or more of the features described herein, the receiving the reflected signals at each node includes receiving the reflected signals at one or more receive antenna elements at each node.

In addition to one or more of the features described herein, the generating the velocity lines includes computing:

$$V_{y'} = \frac{V_r}{\cos(\theta)} - \tan(\theta) V_{x'},$$

where
Vy' and Vx' are values on two perpendicular axes.

In addition to one or more of the features described herein, the determining the one or more intersection points includes determining the intersection point for each set of intersecting ones of the velocity lines.

In addition to one or more of the features described herein, the method also includes training a neural network to perform the determining the one or more intersection points.

In addition to one or more of the features described herein, the training the neural network includes obtaining training reflected signals from a training radar system or obtaining simulated reflected signals.

In addition to one or more of the features described herein, the training the neural network includes performing supervised learning by determining actual intersection points corresponding with each training object among one or more of the training objects that generate the training reflected signals or the simulated reflected signals.

In addition to one or more of the features described herein, the training the neural network includes obtaining training intersection points by using the neural network on the training reflected signals or the simulated reflected signals.

In addition to one or more of the features described herein, the training the neural network includes comparing the actual intersection points with the training intersection points to provide feedback to the neural network.

In addition to one or more of the features described herein, the method also includes integrating the multi-node radar system in a vehicle and controlling operation of the vehicle based on information including the velocity of the one or more objects.

In another exemplary embodiment, a system including a multi-node radar system includes each node of the multi-node radar system to receive reflected signals, the reflected signals resulting from reflection of transmitted signals by one or more objects. The system also includes a processor to generate velocity lines associated with each of the reflected signals received at each of the nodes. Each velocity line is derived from a radial velocity Vr and an angle of arrival θ determined from the reflected signal received at the node. The processor also determines one or more intersection points of the velocity lines, and estimates a velocity of each of the one or more objects based on the one or more intersection points. Each intersection point corresponds with the velocity for one of the one or more objects and the velocity is a relative velocity vector between the one of the one or more objects and the radar system.

In addition to one or more of the features described herein, each node of the multi-node radar system includes one or more receive antenna elements.

In addition to one or more of the features described herein, the processor generates the velocity lines by computing:

$$V_{y'} = \frac{V_r}{\cos(\theta)} - \tan(\theta) V_{x'},$$

where
Vy' and Vx' are values on two perpendicular axes.

In addition to one or more of the features described herein, the processor determines the one or more intersection points based on determining the intersection point for each set of intersecting ones of the velocity lines.

In addition to one or more of the features described herein, the processor implements a neural network to determine the one or more intersection points.

In addition to one or more of the features described herein, the neural network is trained based on obtaining training reflected signals from a training radar system or obtaining simulated reflected signals.

In addition to one or more of the features described herein, the neural network is trained based on performing supervised learning by determining actual intersection points corresponding with each training object among one or more of the training objects that generate the training reflected signals or the simulated reflected signals.

In addition to one or more of the features described herein, the neural network is trained based on obtaining training intersection points by using the neural network on the training reflected signals or the simulated reflected signals.

In addition to one or more of the features described herein, the neural network is trained based on comparing the actual intersection points with the training intersection points to provide feedback to the neural network.

In addition to one or more of the features described herein, the multi-node radar system is in a vehicle and operation of the vehicle is controlled based on information including the velocity of the one or more objects.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
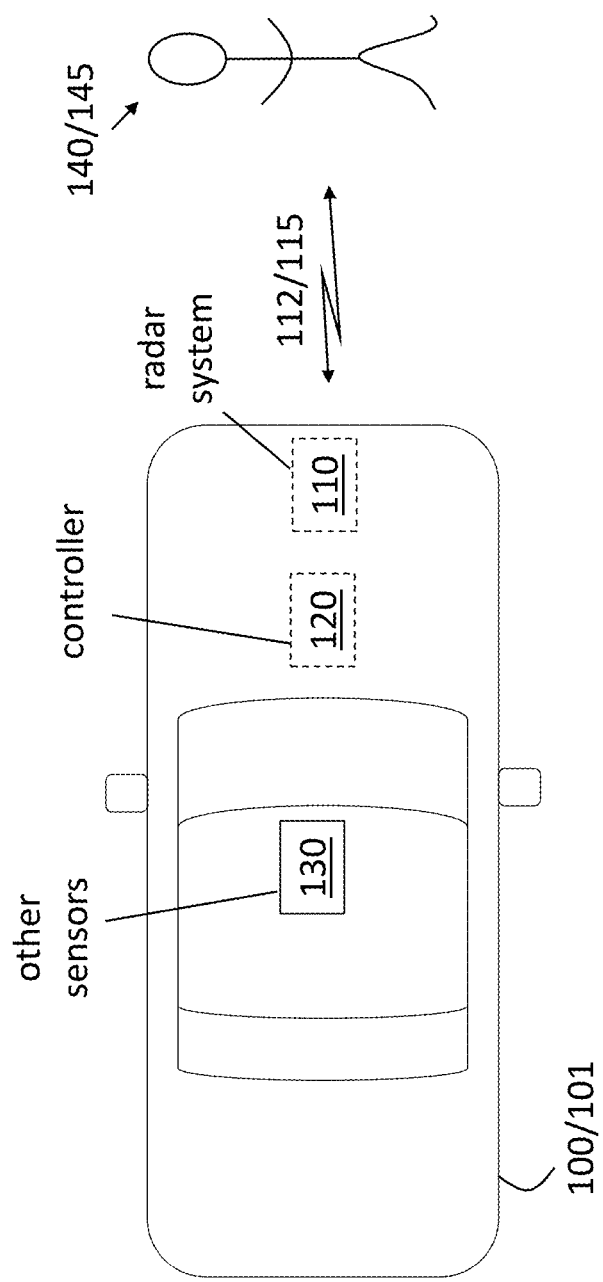
FIG. 1 is a block diagram of a vehicle with a radar system that discriminates among multiple objects and estimates their velocities.

The following description is merely exemplary in nature and is not intended to limit the present disclosure, its application or uses. It should be understood that throughout the drawings, corresponding reference numerals indicate like or corresponding parts and features.

As previously noted, a multi-node radar system expands the field of view but presents challenges in a scenario involving multiple objects at similar ranges from the radar system. This is because the reflections from each of the objects appear at a different angle of arrival at each of the nodes. Further, there may be an overlap in the angle of arrival determined for different objects at the different nodes. As such, the information obtained at all of the nodes is difficult to parse in order to identify each of the multiple objects and estimate each of their velocities. Velocity refers to the relative velocity between the object and the radar system. Embodiments of the systems and methods detailed herein relate to discriminating among multiple objects and estimating their velocities using a multi-node radar system. Specifically, the radial velocity estimated at each node for each object is represented as a velocity line. Intersection points of the velocity lines are used to discriminate among the multiple objects and estimate their velocities. Identification of the intersection points is performed by a neural network that is trained based on supervised learning.

In accordance with an exemplary embodiment, FIG. 1 is a block diagram of a vehicle 100 with a radar system 110 that discriminates among multiple objects 140 and estimates their velocities. As previously noted, the velocity that is estimated is the relative velocity between a given object 140 and the radar system 110. The radar system 110, which may be in the vehicle 100 as in the example shown in FIG. 1, may be moving or stationary. The exemplary vehicle 100 shown in FIG. 1 is an automobile 101. The vehicle 100 may include other sensors 130 (e.g., lidar system, camera) in addition to the radar system 110. A controller 120 may control aspects of the operation of the vehicle 100 based on information obtained from the radar system 110 alone or in combination with other sensors 130. The radar system 110 transmits transmit signals 112 and receives reflected signals 115 when objects 140 in the field of view of the radar system 110 reflect the transmit signals 112. The exemplary object 140 shown in FIG. 1 is a pedestrian 145.

The reflected signals 115 may be processed within the radar system 110, by the controller 120, or a combination of the two. Whether in the radar system 110 or the controller 120, the processing involves processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As further detailed, the processing facilitates discrimination among multiple objects 140 with overlapping ranges and Doppler frequencies that are in the field of view of the radar system 110.

Figure 2:
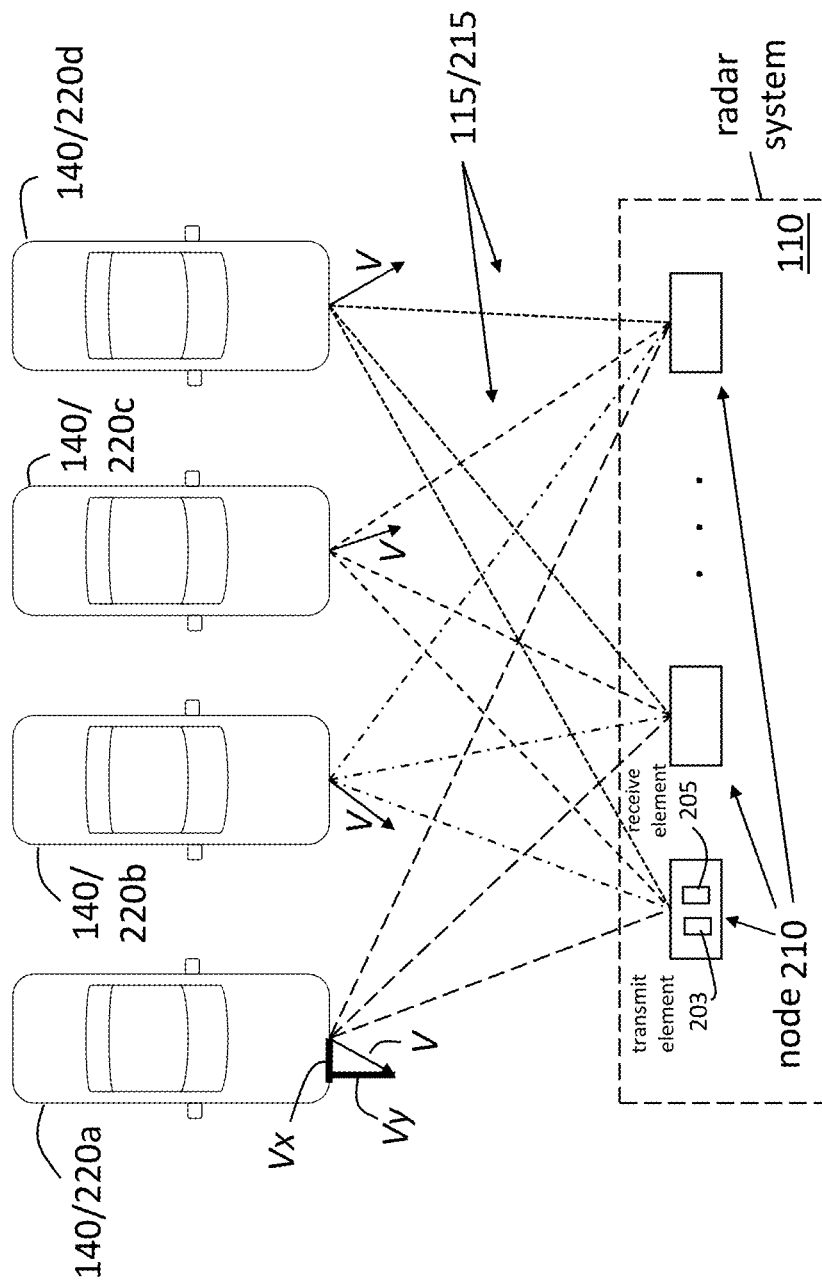
FIG. 2 shows aspects of a radar system that is configured to discriminate among multiple objects and estimate their velocities according to one or more embodiments.

FIG. 2 shows aspects of a radar system 110 that is configured to discriminate among multiple objects and estimate their velocities according to one or more embodiments. The radar system 110 includes a number (e.g., ten) of nodes 210. Each node 210 includes one or more transmit elements 203 and one or more receive elements 205, or, according to alternate embodiments, one or more transceiver elements that both emit the transmit signals 112 and receive reflected signals 115. Four objects 140 are shown in FIG. 2. The exemplary objects 140 are cars 220a, 220b, 220c, 220d (generally referred to as 220). The velocity vector V is indicated for each car 220. In the case of the car 220a, the lateral and longitudinal components Vx and Vy of the velocity vector V are also indicated. Each of the cars 220 provides reflected signals 115 to each of the nodes 210, and these reflected signals 115 include velocity projections 215. Each velocity projection 215 is a projection of the corresponding velocity vector V in the radial axis to the given node 210. That is, the velocity projection 215 to a given node 210 indicates the radial velocity Vr (i.e., Doppler measurement) at that node 210. For a given car 220, the radial velocity determined at each of the nodes 210 is unlikely to be the same. Further, when the results at all the nodes 210 are considered together, the radial velocities of different ones of the cars 220 are likely to be similar. This issue created by the overlapping ranges and Doppler frequencies of the cars 220 is addressed by processing the reflected signals 115 according to one or more embodiments.

Figure 3:
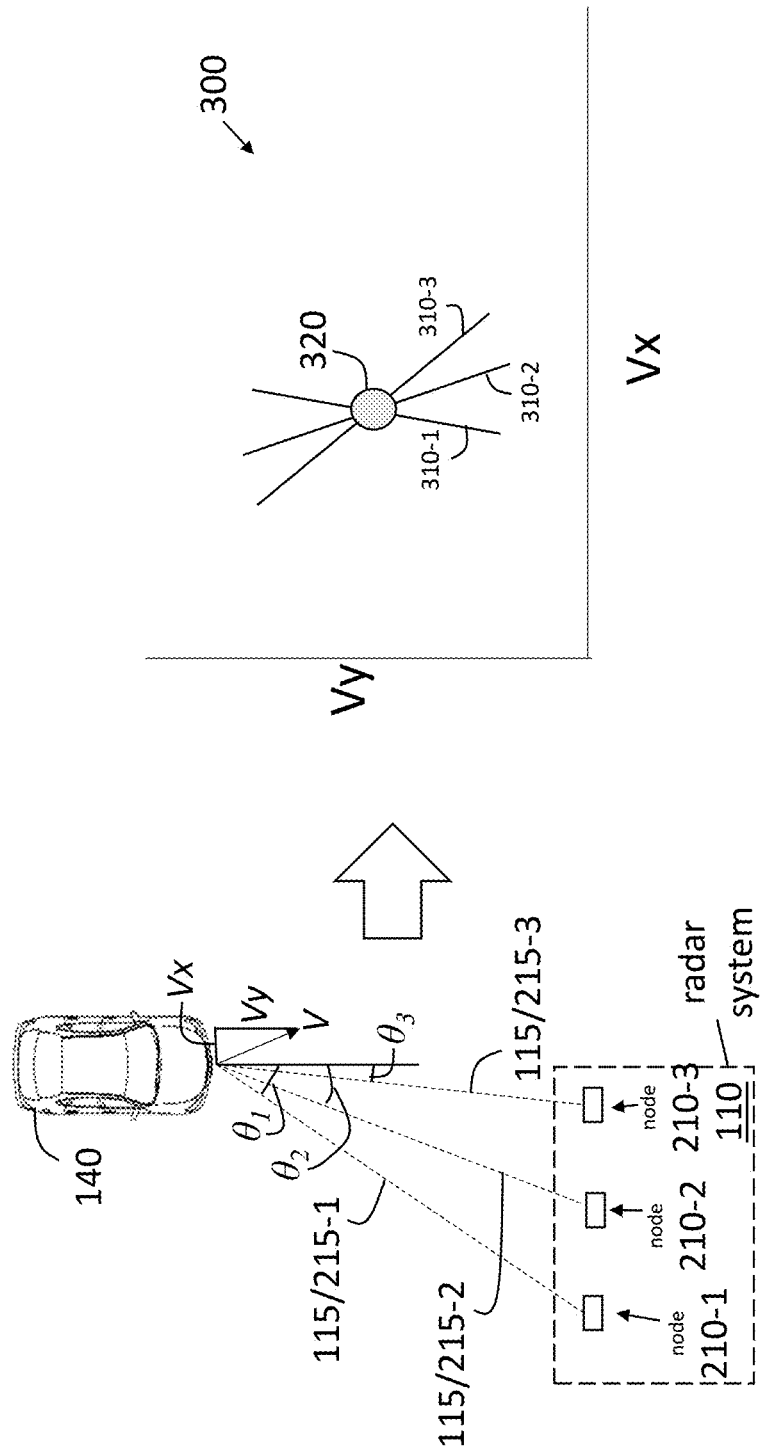
FIG. 3 illustrates an approach to discriminate among multiple objects and estimate their velocities according to one or more embodiments.

FIG. 3, with continuing reference to FIGS. 1 and 2, illustrates an approach to discriminate among multiple objects 140 and to estimate their velocities according to one or more embodiments. One object 140 and a radar system 110 with three nodes 210-1, 210-2, 210-3 (generally 210) are shown in FIG. 3 for explanatory purposes. The velocity vector V for the object 140 is indicated along with the lateral and longitudinal components Vx and Vy. The velocity projection 215-1, 215-2, 215-3 (generally referred to as 215) associated with the reflected signal 115 to each node 210 is indicated. As previously noted, the velocity projection 215 indicates the corresponding radial velocity Vr detected for the object 140 at the node 210. The angles of arrival $\theta_1$, $\theta_2$, $\theta_3$ (generally $\theta$) of the reflected signals 115 to respective nodes 210 are indicated, as well.

An image 300 including the velocity lines 310-1, 310-2, 310-3 (generally referred to as 310) respectively associated with the nodes 210-1, 210-2, 210-3 is shown. Each velocity line 310 is given by:

$$V_{y'} = \frac{V_r}{\cos(\theta)} - \tan(\theta) V_{x'},\qquad [\text{EQ. 1}]$$

EQ. 1 includes the lateral and longitudinal components Vx' and Vy' of the radial velocity Vr determined at each node 210. The determination of the radial velocity Vr and the angle of arrival $\theta$ at each node 210 may be performed within the radar system 110 or by the controller 120 or by a combination of the two. The determination of the radial velocity Vr and the angle of arrival $\theta$ at each node 210 results from standard processing that implements fast Fourier transforms (FFTs) and beamforming. The intersection 320 of the velocity lines 310 is an estimate of the true velocity vector V of the object 140. That is, the lateral and longitudinal components Vx and Vy that correspond with the intersection 320 are used to estimate the velocity vector V of the object 140. This velocity vector V indicates the relative velocity of the object 140 with respect to the radar system 110. When each node 210 receives reflected signals 115 from multiple objects 140, as in the example illustrated in FIG. 2, multiple intersections 320, each corresponding to the estimate of the velocity vector V of one of the objects 140, are determined, as further discussed with reference to FIG. 4.

Figure 4:
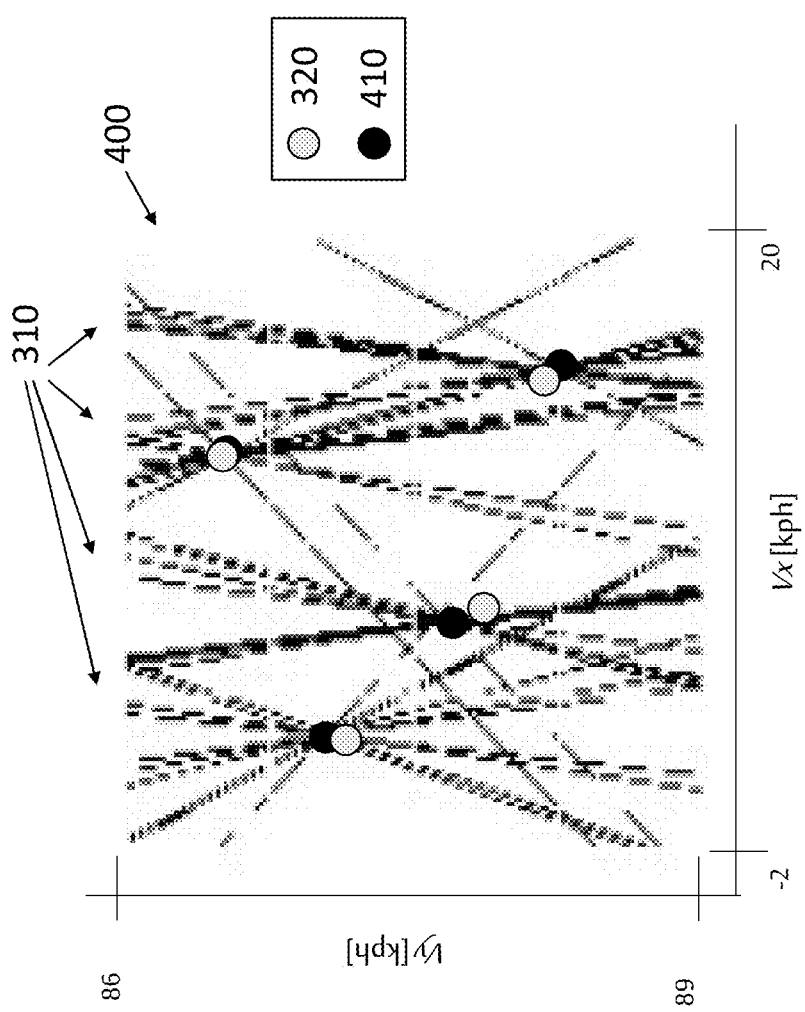
FIG. 4 shows the extension of the approach shown in FIG. 3 to the four exemplary objects shown in FIG. 2.

FIG. 4, with continuing reference to FIGS. 1-3, shows the extension of the approach shown in FIG. 3 to the four exemplary objects 140 shown in FIG. 2. The lateral and longitudinal components Vx and Vy are indicated in kilometers per hour (kph). An image 400 of all the velocity lines 310 obtained for all the nodes 210 is shown. The intersection 320 associated with each set of velocity lines 310, which correspond with each object 140, is indicated along with the true intersection 410 associated with the velocity vector V of the corresponding object 140. As detailed with reference to FIG. 5, a neural network is used to identify the intersection 410 for each set of velocity lines 310.

Figure 5:
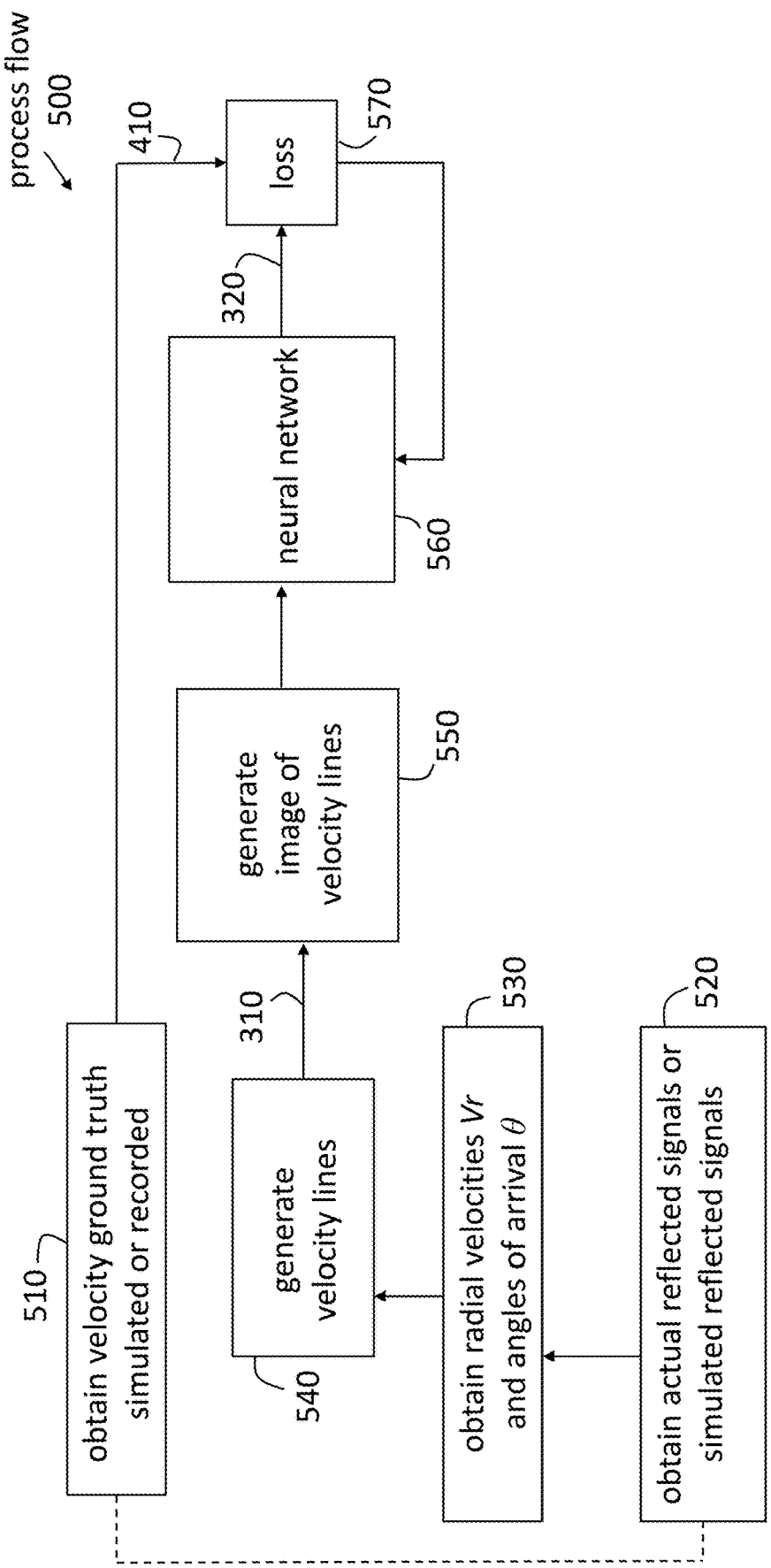
FIG. 5 is a process flow of a method of training a neural network to discriminate among multiple objects and estimate their velocities using a multi-node radar system according to one or more embodiments.

FIG. 5, with continuing reference to FIGS. 1-4, is a process flow 500 of a method of training a neural network to discriminate among multiple objects and estimate their velocities using a multi-node radar system according to one or more embodiments. The neural network is trained to determine an intersection 320 for each set of velocity lines 310, as discussed with reference to FIGS. 3 and 4. The training of the neural network is supervised, meaning that the true intersection 410 (i.e., ground truth), as discussed with reference to FIG. 4, is provided as part of the training. At block 510, obtaining velocity ground truth refers to using simulations or real recorded data to determine an intersection 410 corresponding with one or more objects 140.

At block 520, the process flow 500 includes obtaining actual reflected signals 115 or simulated reflected signals 115. If simulations are used to generate the ground truth (at block 510), the reflected signals 115 that are part of those simulations may be used at block 520. At block 530, obtaining radial velocities Vr and angles of arrival $\theta$ refers to performing standard processing on the reflected signals 115 that are obtained at block 520. Generating velocity lines 310, at block 540, includes using the radial velocity Vr and angle of arrival $\theta$ at each node 210 (obtained at block 530) in EQ. 1. At block 550, the process flow 500 includes generating an image 300, 400 of the velocity lines 310 generated for all of the nodes 210 (at block 540).

At block 560, the neural network uses the image 300, 400 of the velocity lines 310 to provide an intersection 320 associated with each set of velocity lines 310. Each set of velocity lines 310 corresponds with one object 140 that provided reflected signals 115 based on transmissions 112 from the radar system 110. The one or more intersections 320 from the neural network (at block 560) and the true intersections 410 (from block 510) are provided for a determination of loss, at block 570. The output from block 570 provides feedback to the neural network, at block 560. The loss determination may be based on an L1-norm loss function or L2-norm loss function, for example. The neural network, at block 560, is trained according to the process flow 500 based on a number of obtained or simulated data sets corresponding with different numbers of objects 140 with different velocity vectors V.

Figure 6:
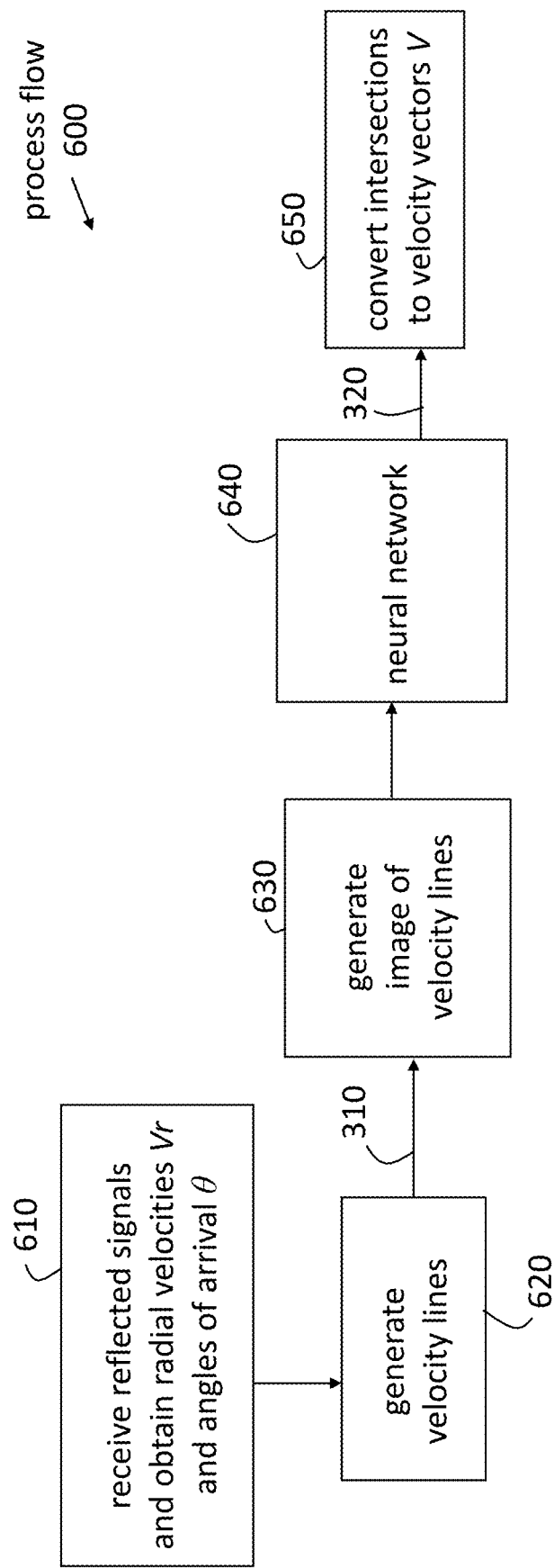
FIG. 6 is a process flow of a method of discriminating among multiple objects and estimating their velocities using a multi-node radar system according to one or more embodiments.

FIG. 6, with continuing reference to FIGS. 1-4, is a process flow 600 of a method of discriminating among multiple objects and estimating their velocities using a multi-node radar system according to one or more embodiments. Once the neural network at block 560 is trained according to the discussion with reference to FIG. 5, it can be applied at block 640. At block 610, receiving reflected signals 115 and obtaining radial velocities Vr and angles of arrival $\theta$ refers to using any number of nodes 210 to receive reflected signals 115 and performing standard processing (e.g., FFTs, beamforming). Generating velocity lines 310, at block 620, refers to using EQ. 1 for each radial velocity Vr and angle of arrival $\theta$ determined at every node 210 block 610. Generating an image 300, 400 of the velocity lines 310, at block 630, facilitates using the trained neural network, at block 640, to identify an intersection 320 for each set of velocity lines 310. At block 650, each intersection 320 output by the neural network (at block 640), may be converted to a velocity vector V. That is, each Vx and Vy pair indicated by each intersection corresponds with a velocity vector V.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of using a multi-node radar system, the method comprising:
receiving reflected signals at each node of the multi-node radar system, the reflected signals resulting from reflection of transmitted signals by one or more objects;
generating, using a processor, velocity lines associated with each of the reflected signals received at each of the nodes, each velocity line being derived from a radial velocity Vr and an angle of arrival θ determined from the reflected signal received at the node;
determining, using the processor, one or more intersection points of the velocity lines; and
estimating, using the processor, a velocity of each of the one or more objects based on the one or more intersection points, each intersection point corresponding with the velocity for one of the one or more objects and the velocity being a relative velocity vector between the one of the one or more objects and the radar system.

2. The method according to claim 1, wherein the receiving the reflected signals at each node includes receiving the reflected signals at one or more receive antenna elements at each node.

3. The method according to claim 1, wherein the generating the velocity lines includes computing:

$$V_{y'} = \frac{V_r}{\cos(\theta)} - \tan(\theta)V_{x'},$$

where
Vy' and Vx' are values on two perpendicular axes.

4. The method according to claim 1, wherein the determining the one or more intersection points includes determining the intersection point for each set of intersecting ones of the velocity lines.

5. The method according to claim 1, further comprising training a neural network to perform the determining the one or more intersection points.

6. The method according to claim 5, wherein the training the neural network includes obtaining training reflected signals from a training radar system or obtaining simulated reflected signals.

7. The method according to claim 6, wherein the training the neural network includes performing supervised learning by determining actual intersection points corresponding with each training object among one or more of the training objects that generate the training reflected signals or the simulated reflected signals.

8. The method according to claim 7, wherein the training the neural network includes obtaining training intersection points by using the neural network on the training reflected signals or the simulated reflected signals.

9. The method according to claim 8, wherein the training the neural network includes comparing the actual intersection points with the training intersection points to provide feedback to the neural network.

10. The method according to claim 1, further comprising integrating the multi-node radar system in a vehicle and controlling operation of the vehicle based on information including the velocity of the one or more objects.

11. A system including a multi-node radar system, the system comprising:
each node of the multi-node radar system configured to receive reflected signals, the reflected signals resulting from reflection of transmitted signals by one or more objects; and
a processor configured to generate velocity lines associated with each of the reflected signals received at each of the nodes, each velocity line being derived from a radial velocity Vr and an angle of arrival θ determined from the reflected signal received at the node, to determine one or more intersection points of the velocity lines, and to estimate a velocity of each of the one or more objects based on the one or more intersection points, each intersection point corresponding with the velocity for one of the one or more objects and the velocity being a relative velocity vector between the one of the one or more objects and the radar system.

12. The system according to claim 11, wherein each node of the multi-node radar system includes one or more receive antenna elements.

13. The system according to claim 11, wherein the processor is configured to generate the velocity lines by computing:

$$V_{y'} = \frac{V_r}{\cos(\theta)} - \tan(\theta)V_{x'},$$

where
Vy' and Vx' are values on two perpendicular axes.

14. The system according to claim 11, wherein the processor is configured to determine the one or more intersection points based on determining the intersection point for each set of intersecting ones of the velocity lines.

15. The system according to claim 11, wherein the processor is configured to implement a neural network to determine the one or more intersection points.

16. The system according to claim 15, wherein the neural network is trained based on obtaining training reflected signals from a training radar system or obtaining simulated reflected signals.

17. The system according to claim 16, wherein the neural network is trained based on performing supervised learning by determining actual intersection points corresponding with each training object among one or more of the training objects that generate the training reflected signals or the simulated reflected signals.

18. The system according to claim 17, wherein the neural network is trained based on obtaining training intersection points by using the neural network on the training reflected signals or the simulated reflected signals.

19. The system according to claim 18, wherein the neural network is trained based on comparing the actual intersection points with the training intersection points to provide feedback to the neural network.

20. The system according to claim 11, wherein the multi-node radar system is in a vehicle and operation of the vehicle is controlled based on information including the velocity of the one or more objects.

* * * * *